(12) United States Patent
Simon

(10) Patent No.: US 7,862,166 B1
(45) Date of Patent: Jan. 4, 2011

(54) SIDE-VIEW MIRROR ATTACHMENT FOR SPECTACLES

(76) Inventor: Johnny Simon, 409 1st St., Orlando, FL (US) 32824

( * ) Notice: Subject to any disclaimer, the term of this patent is extended or adjusted under 35 U.S.C. 154(b) by 0 days.

(21) Appl. No.: 12/792,847

(22) Filed: Jun. 3, 2010

Related U.S. Application Data

(63) Continuation-in-part of application No. 11/874,997, filed on Oct. 19, 2007, now Pat. No. 7,748,841.

(51) Int. Cl.
*G02C 7/14* (2006.01)
(52) U.S. Cl. .......................................... 351/50; 351/158
(58) Field of Classification Search .................. 351/50, 351/41, 158; 359/818, 871, 872, 879, 880, 359/881
See application file for complete search history.

(56) References Cited

U.S. PATENT DOCUMENTS

| | | | | | |
|---|---|---|---|---|---|
| 1,074,145 | A | * | 9/1913 | Walts | 351/50 |
| 3,988,058 | A | * | 10/1976 | Chaney et al. | 359/880 |
| 4,105,183 | A | * | 8/1978 | Clark | 248/484 |
| 4,349,246 | A | * | 9/1982 | Binner | 359/880 |
| 4,603,944 | A | * | 8/1986 | Greenlaw et al. | 359/818 |
| 4,974,954 | A | * | 12/1990 | Muller | 351/50 |
| 5,048,943 | A | * | 9/1991 | Allen | 351/50 |

* cited by examiner

*Primary Examiner*—Hung X Dang

(57) ABSTRACT

A side-view mirror attachment for a pair of spectacles constructed of a pair of mirrors each having a hemispherical shape, a center frame that has two opposite ends each fixedly connected to one of the pair of mirrors, and a mounting device for either detachably or permanently mount the attachment to a pair of spectacles.

7 Claims, 5 Drawing Sheets

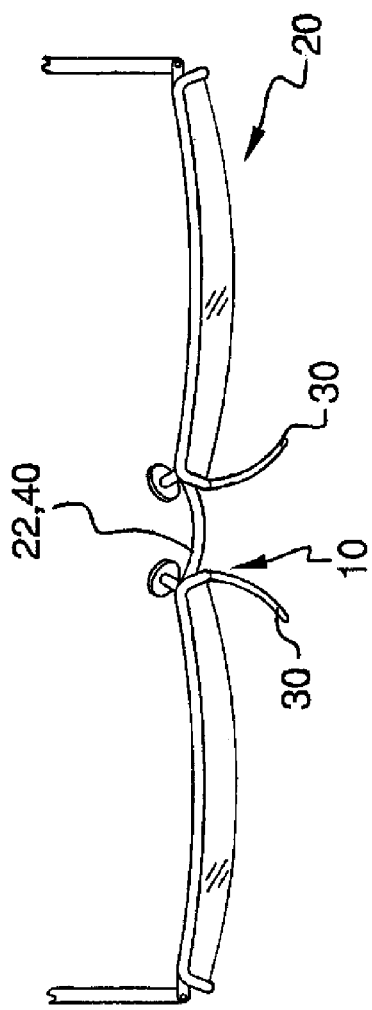
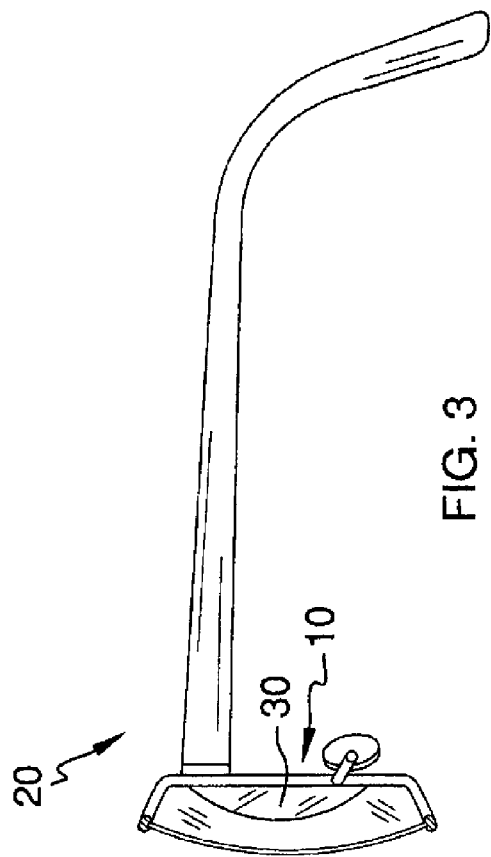
FIG. 2
FIG. 3

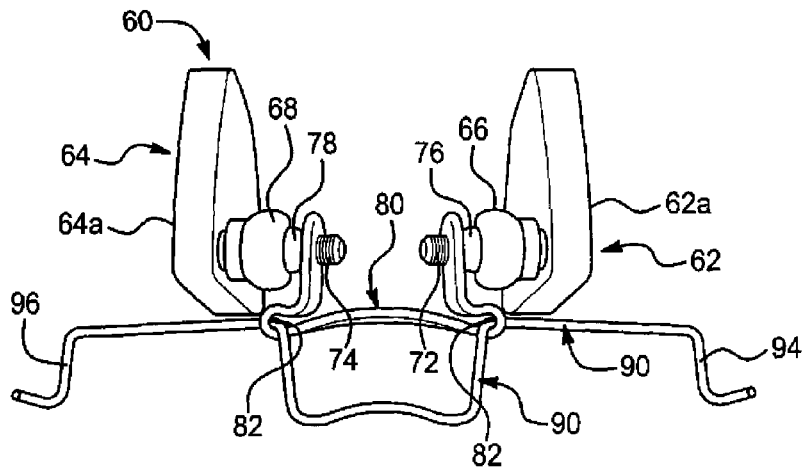
FIG. 6
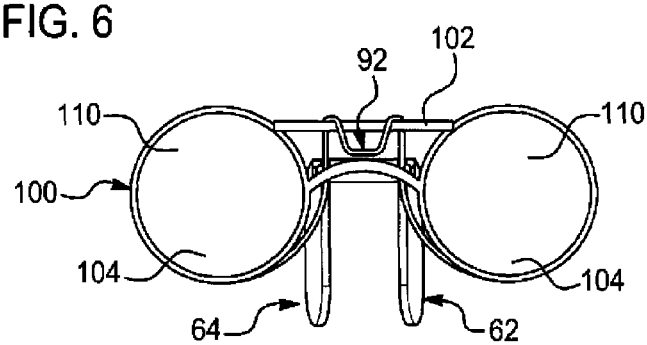
FIG. 7
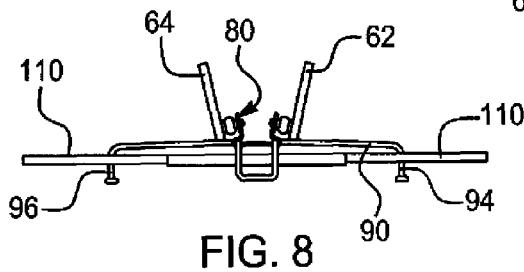
FIG. 8
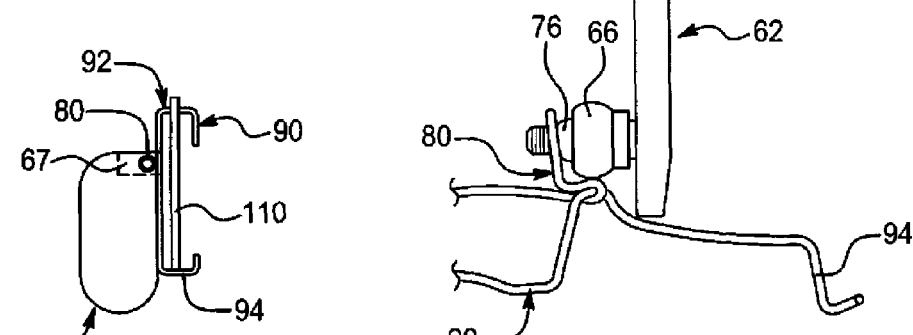
FIG. 9
FIG. 10

US 7,862,166 B1

SIDE-VIEW MIRROR ATTACHMENT FOR SPECTACLES

CROSS REFERENCE TO RELATED APPLICATIONS

This application is a continuation-in-part of U.S. patent application Ser. No. 11/874,997, filed on Oct. 19, 2007, now U.S. Pat. No. 7,748,841 the entire disclosure of which is incorporated by reference herein.

FIELD OF THE INVENTION

The present invention generally relates to an accessory for a pair of spectacles and more particularly, relates to a side-view mirror attachment for a pair of spectacles that can be removably mounted or permanently mounted.

BACKGROUND OF THE INVENTION

Spectacles or eyeglasses have been used for centuries by people to improve their vision or to shelter their eyes from the sun. The spectacles that are currently available in the marketplace while improving a person's vision in the forward direction, they do not improve a person's peripheral vision which may be important in certain situations. For instance, for people who are suffering with the disease of glaucoma or other eye problems, their peripheral vision is greatly affected and therefore needs a remedial device to help them improving their peripheral visions. It is therefore desirable to provide a device that can be either detachably mounted or permanently mounted on a person's spectacles to allow the person to view items to their sides without having to turn their heads.

It is therefore an object of the present invention to provide a spectacles for improving a person's peripheral vision that does not have the drawbacks or shortcomings of the conventional spectacles.

It is another object of the present invention to provide side-view mirror attachment for spectacles that can be detachably mounted on a person's spectacles.

It is a further object of the present invention to provide side-view mirror attachment that can be permanently mounted on a person's spectacles.

SUMMARY OF THE INVENTION

In accordance with the present invention, a side-view mirror attachment for spectacles for improving a person's peripheral vision is provided.

In a preferred embodiment, the present invention side-view mirror attachment for spectacles is constructed of a pair of mirrors each having a hemispherical shape, an inner surface of mirror finish and an outer surface; a center frame that has two opposite ends each fixedly connected to one of the pair of mirrors with an inner surface facing rearwardly toward a wearer such that a side-view of a scenery to the side of the wearer can be seen on the mirrored inner surface by the wearer; and a mounting device on the center frame for mounting the side-view mirror attachment onto a spectacle.

BRIEF DESCRIPTION OF THE DRAWINGS

The invention will now be described, by way of example, with reference to the accompanying drawings, in which:

FIG. 2 is a top view of the present invention spectacles shown in FIG. 1.

FIG. 3 is a side view of the present invention spectacles shown in FIG. 1.

FIG. 6 is a perspective view of a second preferred embodiment of the present invention illustrating a multi-directionally adjustable side-view mirror attachment for spectacles.

FIG. 7 is a front view of the second preferred embodiment of the present invention as mounted on a pair of spectacles.

FIG. 8 is a top view of the second preferred embodiment of the present invention as mounted on a pair of spectacles.

FIG. 9 is a side view of the second preferred embodiment of the present invention as mounted on a pair of spectacles.

FIG. 10 is a partial, enlarged top view of the second preferred embodiment of the present invention illustrating the ball joint structure for mounting the mirror to the first mounting member.

DETAILED DESCRIPTION OF THE PREFERRED EMBODIMENT

The present invention discloses a side-view mirror attachment for use on a pair of spectacles that can be either detachably mounted or can be permanently mounted.

The present invention side-view mirror attachment for spectacles is an accessory for various optical products designed to improve a user's peripheral vision. It can be secured to prescription glasses, sunglasses, reading glasses, etc. to allow individuals to view items to their sides without having to turn their head. While the side-view mirror attachment can be of use to a wide variety of individuals, it is particularly appealing to individuals with glaucoma or other adverse eye conditions which may have poor peripheral vision. The present invention side view mirror attachment consists of a section of mirrored plastic lenses that measures about ⅛ inch think that rests within an acrylic frame. The product can be produced in the shape of a half circle, i.e. in a hemispherical shape, and can be positioned on top of the nosepiece of the spectacles. It can be temporarily (detachably) or permanently secured to the pair of spectacles. It may contain a hinge through which it can be flipped upward out of the individuals view. The side-view mirror attachment may have a dimension that measures about 1 inch long and about 1 inch wide.

The present invention side-view mirror attachment for spectacles fulfills the need for an optical accessory designed to allow individuals to see objects to there sides. The appealing features of the side-view mirror attachment are its ability to improve the users peripheral vision, as well as its safety, convenience, practicality, ease of placement, and reasonable price. The side-view mirror attachment can be temporality or permanently secured to the nosepieces of the glasses in order to provide a mirrored surface through which wearers can see in their periphery. Thus, the use of the side-view mirror attachment can provide improved visual acuity. It is particularly appealing to individuals with various eye conditions such as glaucoma who may loose their side vision. It would provide these individuals with added safety and piece of mind. The present invention side-view mirror attachment can be secured to prescription glasses, reading glasses, and sunglasses.

Figure 1:
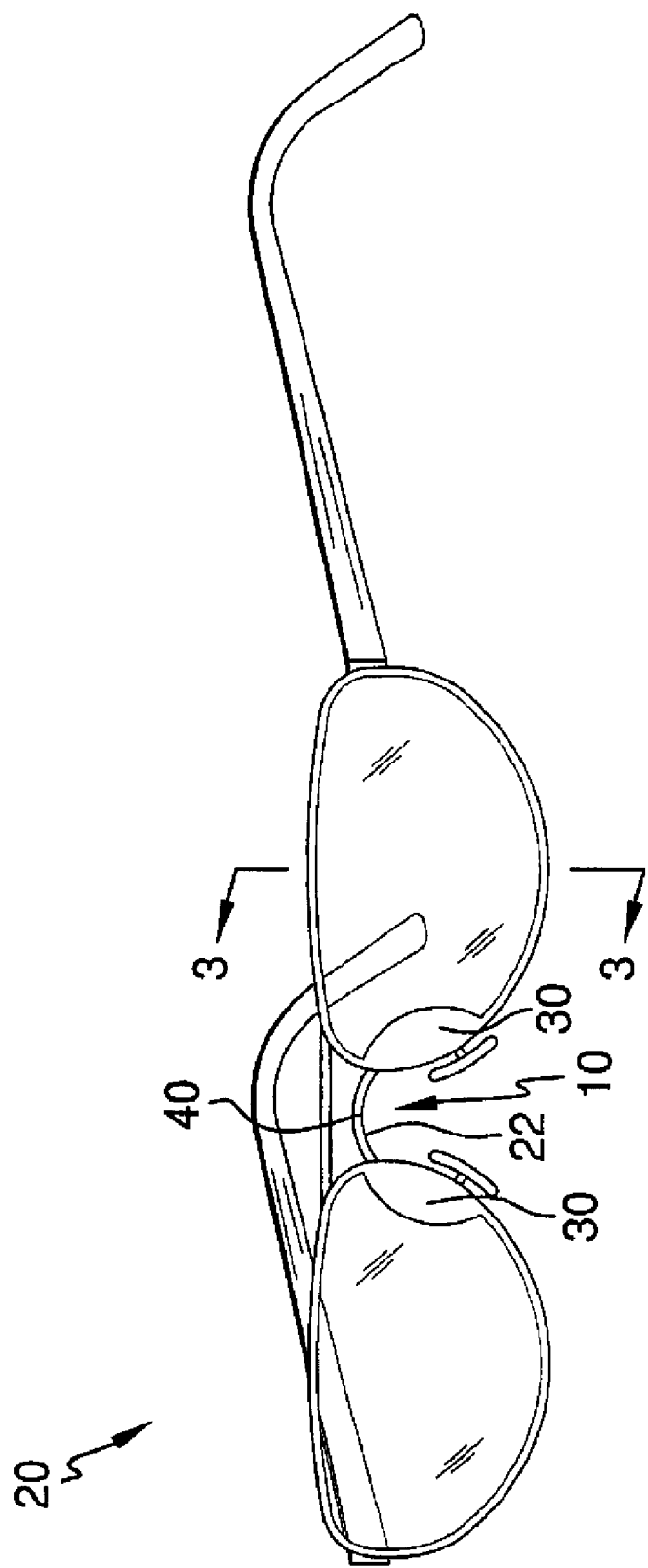
FIG. 1 is a perspective view of the present invention side-view mirror attachment that is permanently mounted on a pair of spectacles.

Referring initially to FIG. 1, wherein a present invention side-view mirror attachment 10 is shown permanently installed on a pair of spectacles 20. The side view mirror attachment 10 is constructed of, as shown in FIGS. 1-5, a pair of mirrors 30 each has a hemispherical shape, an inner surface 32 of mirror finish and an outer surface 34. This is best shown in FIG. 5. A center frame 40, best shown in FIG. 4, that has two opposite ends 42, 44 each fixedly connected to one of the pair of mirrors 30 with the inner surface 32 facing rearwardly toward a wearer (not shown) such that a side view of a scenery to the side of the wearer can be seen on the mirrored inner surface 32 by the wearer.

The present invention side-view mirror attachment 10 can be either mounted on a pair of spectacles 20 in a detachable manner or in a permanent manner. FIGS. 1, 2 and 3 shows the attachment 10 mounted on the pair of spectacles 20 in a permanent manner wherein the center frame 40 can be either formed as an integral part with the bridge piece 22, shown in FIG. 4, of the pair of spectacles 20, or can be permanently bonded to the bridge piece 22 such that the side-view mirror attachment 10 cannot be separated.

Figure 4:
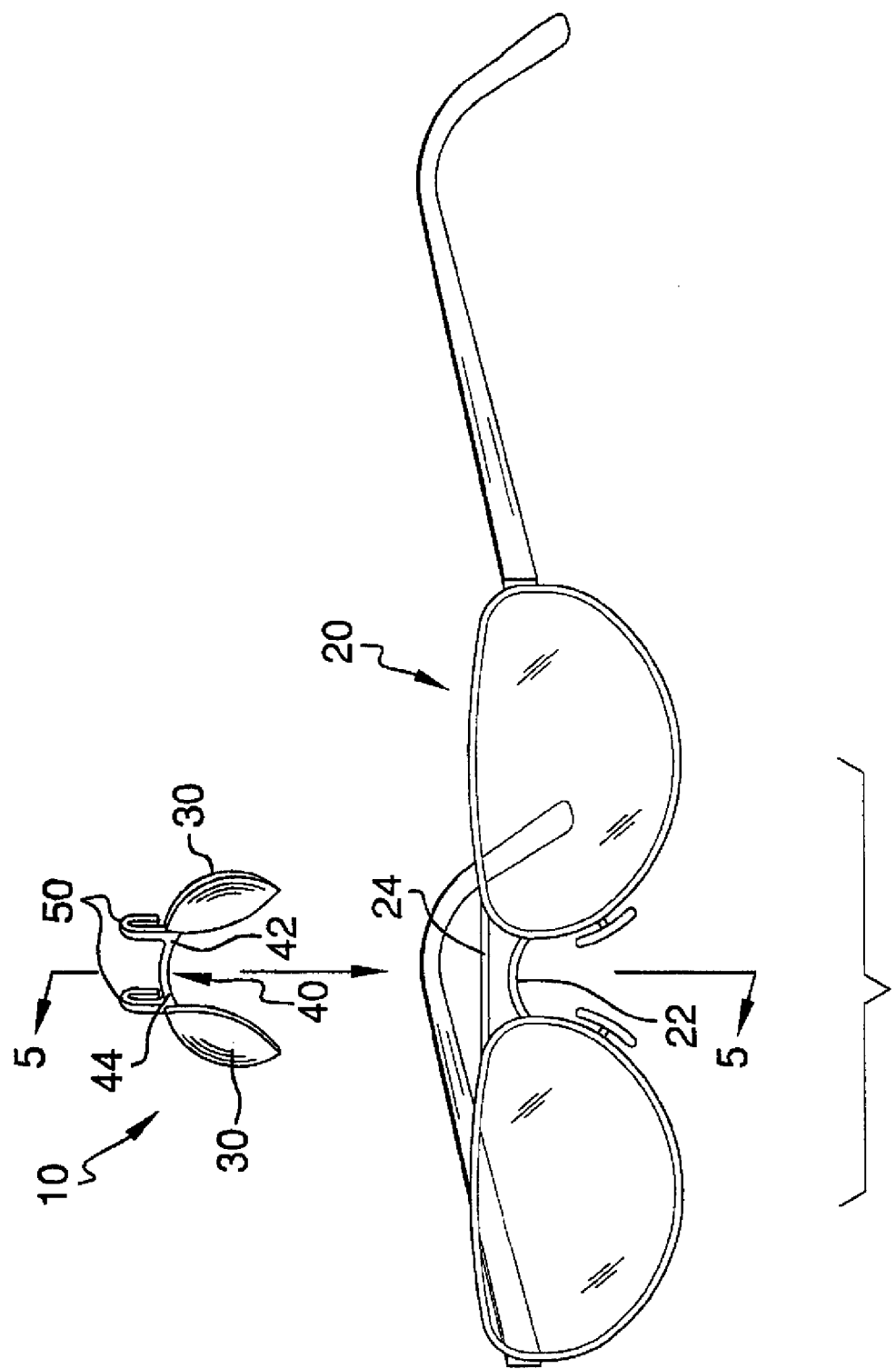
FIG. 4 is a perspective view of a detachable side-view mirror attachment positioned over a pair of spectacles.
Figure 5:
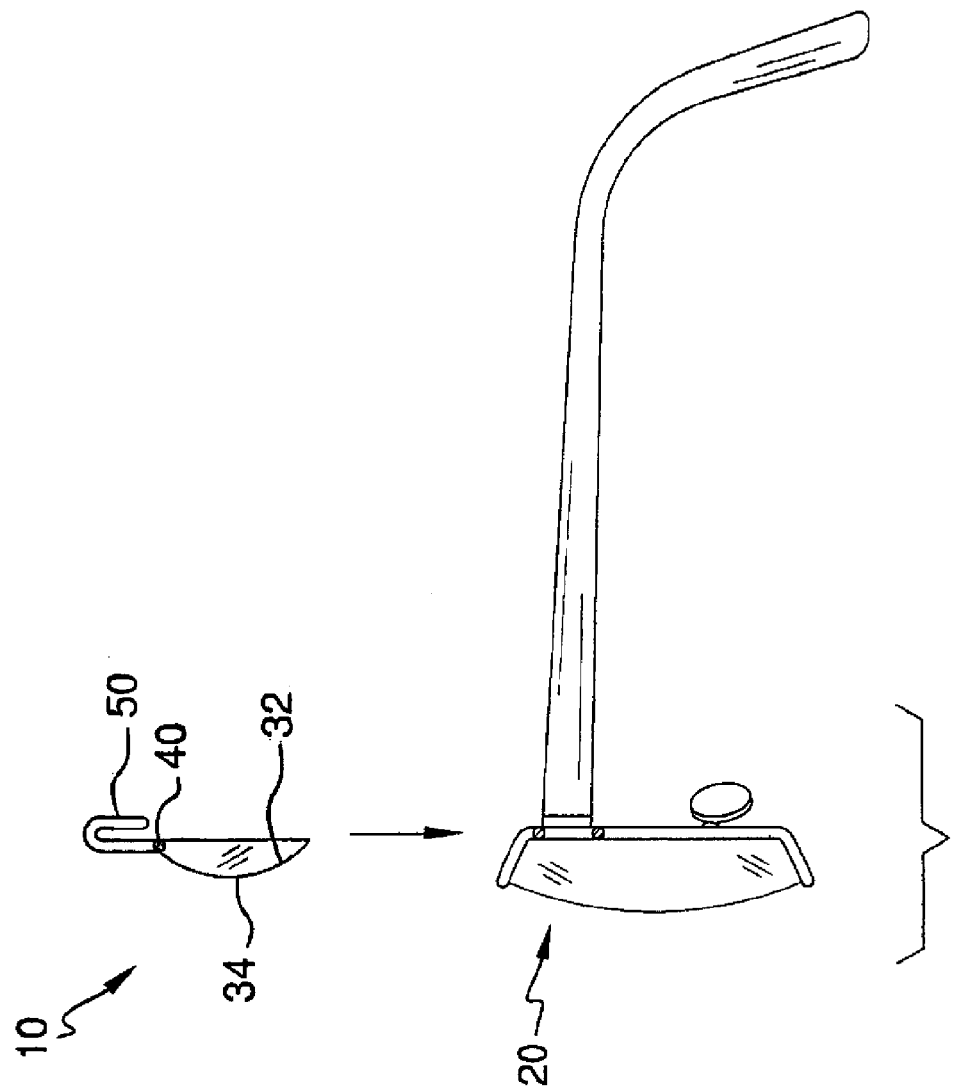
FIG. 5 is a side-view of the detachable side-view mirror attachment and the pair of spectacles shown in FIG. 4.

In the detachable model of the present invention side-view mirror attachment 10, shown in FIG. 4, additional clips 50 which can be advantageously molded as a single piece in a plastic material with the bridge piece 40 are provided for clipping onto the bridge member 24 shown in FIG. 4. In this embodiment, the side view mirror attachment 10 can be detached easily for mounting on various perspiration glasses, sunglasses, reading glasses, etc. The glass mirror can also be made of convex plastic and the frames made of metal or plastic with a dimension of about 1 inch by 1 inch.

In a second preferred embodiment shown in FIGS. 6-10, a present invention side view mirror attachment 60 is shown. The side view mirror attachment 60 is provided with multi-directionally adjustable side-view mirrors 62 and 64. Each of the mirrors 62,64 has an outwardly facing mirror surface 62A and 64A. This is shown in FIG. 6. The mirrors 62,64 are in oblong shape and are rotatably mounted to a female ball joint member 66,68. Each of the female ball joint members 66,68 is mounted to the mirrors 62,64, respectively, by a mounting bolt 67 such that the mirrors 62,64 may turn or rotate relative to the axis of female ball joint members 66,68 in 360°. The female ball joint member 66,68 can be advantageously fabricated in either a polymeric material, such as rubber, or in a metal material.

The two female ball joint members 66,68 rotationally and pivotally engages two male ball joint members 76,78, respectively. This is shown in FIGS. 6 and 10. The male ball joint members 76,78 may be advantageously formed of a metallic material, such as brass or steel and are provided with a threaded end 72,74 for engaging a first mounting member 80. The first mounting member 80 is formed of a U-shaped plate with two opposing ends each threaded therethrough the male ball joint member 72 and 74. The threaded ends 72,74 further provide adjustability of the mirrors 62,64 in relationship to the first mounting member 80. The first mounting member 80 may be suitably a U-shaped plate that is formed of metal.

The first mounting member 80 is further provided with two mounting apertures 82, with one at each end, for mounting therethrough a second mounting member 90 which will be later described.

To mount the present invention multi-directionally adjustable side-view mirror attachment 60 on a pair of spectacles 100, as shown in FIGS. 7 and 8, a second mounting member 90 formed of a metal wire such as stainless steel is used to engage the first mounting member 80 through the apertures 82 such that the first mounting member 80 and the second mounting member 90 are fixedly connected together. The second mounting member 90 is formed with a cradle 92 on top to allow the second mounting member to hook over a top rung 102 of the pair of spectacles 100. The second mounting member 90 is further provided with a pair of extensions 94,96 to engage a bottom portion 104 of the pair of spectacles 100. The two extensions 94,96 can be advantageously formed in a cradle form such that a bottom 104 of the lenses 110 can be securely positioned therein. This further improves the stability of the side view mirror attachment 60 when it is mounted onto the pair of spectacles 100.

It is to be noted that the second preferred embodiment 60 of the present invention side view mirror attachment allows the mirrors 62,64 to rotate or pivot 3-dimensionally in relationship to the first mounting member 80. This allows for a user who may have vision problems due to retinal diseases such as those caused by diabetic conditions, hypertension, retinopathy, macular degeneration, glaucoma, retinal scarring, and other possible retinal diseases.

The present invention side-view mirror attachment for spectacles has therefore been amply described in the above descriptions and in the appended drawings of FIGS. 1-10.

While the preferred embodiments of the invention have been described above, it will be recognized and understood that various modifications can be made in the invention and the appended claims are intended to cover all such modifications which may fall within the spirit and scope of the invention.

What is claimed is:

1. A multi-directionally adjustable side-view mirror attachment for a pair of spectacles comprising:

a pair of mirrors each having an oblong shape, an outer surface of mirror finish, an inner surface, rotatably mounted to a female ball joint member;

a first mounting member of U-shape having two opposite ends each mounted therethrough a male ball joint member for rotationally and pivotally engaging said female ball joint member mounted on one of said pair of mirrors;

said pair of mirrors with said mirrored surfaces facing outwardly away from said first mounting member such that a side-view of a scenery to the side of the wearer can be seen on said mirrored surface by the wearer; and a second mounting member engaging said first mounting member for mounting said side-view mirror attachment onto said pair of spectacles.

2. The multi-directionally adjustable side-view mirror attachment for a pair of spectacles according to claim 1, wherein said first mounting member is an U-shaped metal plate.

3. The multi-directionally adjustable side-view mirror attachment for a pair of spectacles according to claim 1, wherein said second mounting member is a metal wire clip detachably clipping said side-view mirror to said pair of spectacles.

4. The multi-directionally adjustable side-view mirror attachment for a pair of spectacles according to claim 1, wherein said second mounting member comprises a first cradle for clipping to a top of said pair of spectacles and a second pair of cradles each for clipping to a bottom edge of a lens.

5. The multi-directionally adjustable side-view mirror attachment for a pair of spectacles according to claim 1, wherein each one of said female ball joint member is rotatably mounted to one of said pair of mirrors by a bolt.

6. The multi-directionally adjustable side-view mirror attachment for a pair of spectacles according to claim 1, wherein said pair of mirrors is fabricated in a plastic material.

7. The multi-directionally adjustable side-view mirror attachment for a pair of spectacles according to claim 1, wherein each of said male ball joint member is mounted through one of said two opposing ends of said first U-shaped mounting member by a threaded bolt.

* * * * *